United States Patent
Liu et al.

(10) Patent No.: US 12,507,127 B2
(45) Date of Patent: Dec. 23, 2025

(54) NETWORK MIGRATION METHOD, NETWORK MIGRATION APPARATUS, COMMUNICATION DEVICE, AND COMMUNICATION SYSTEM

(71) Applicant: VIVO MOBILE COMMUNICATION CO., LTD., Guangdong (CN)

(72) Inventors: Jinhua Liu, Guangdong (CN); Xiaodong Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 482 days.

(21) Appl. No.: 18/073,273

(22) Filed: Dec. 1, 2022

(65) Prior Publication Data
US 2023/0098159 A1   Mar. 30, 2023

Related U.S. Application Data

(63) Continuation of application No. PCT/CN2021/098101, filed on Jun. 3, 2021.

(30) Foreign Application Priority Data

Jun. 3, 2020   (CN) .......................... 202010496964.5

(51) Int. Cl.
   *H04W 36/00*   (2009.01)
   *H04W 36/08*   (2009.01)
   *H04W 36/14*   (2009.01)

(52) U.S. Cl.
   CPC ....... *H04W 36/0005* (2013.01); *H04W 36/08* (2013.01); *H04W 36/14* (2013.01)

(58) Field of Classification Search
   None
   See application file for complete search history.

(56) References Cited

U.S. PATENT DOCUMENTS

| | | | |
|---|---|---|---|
| 2017/0005913 | A1 | 1/2017 | Hampel et al. |
| 2020/0107342 | A1 | 4/2020 | Kuang et al. |

(Continued)

FOREIGN PATENT DOCUMENTS

| | | | |
|---|---|---|---|
| CN | 110149674 A | | 8/2019 |
| CN | 110536350 A | | 12/2019 |

(Continued)

OTHER PUBLICATIONS

First Office Action for Chinese Application No. 202010496964.5, dated Mar. 28, 2022, 12 Pages.

(Continued)

*Primary Examiner* — Shukri Taha

(74) *Attorney, Agent, or Firm* — BROOKS KUSHMAN P.C.

(57) ABSTRACT

A network migration method, a network migration apparatus, a communication device, and a communication system. The method includes: implementing a migration procedure of a first IAB node according to a received first migration command in a case that a target migration command has been transmitted to a target network node, where the target network node is a downstream child IAB node of the first IAB node or UE served by the first IAB node in an IAB network, the target migration command includes migration commands corresponding to all downstream network nodes of the first IAB node in the IAB network, and the first migration command is a migration command corresponding to the first IAB node.

20 Claims, 9 Drawing Sheets

(56) References Cited

U.S. PATENT DOCUMENTS

| | | | |
|---|---|---|---|
| 2021/0168666 A1 | 6/2021 | Li et al. | |
| 2021/0219368 A1 | 7/2021 | Fujishiro et al. | |
| 2021/0250817 A1 | 8/2021 | Zou et al. | |
| 2021/0274394 A1 | 9/2021 | Luo et al. | |
| 2021/0360491 A1* | 11/2021 | Akl | H04W 40/22 |
| 2022/0014976 A1* | 1/2022 | Luo | H04W 36/0044 |
| 2022/0030514 A1* | 1/2022 | Wu | H04W 40/36 |
| 2022/0141749 A1* | 5/2022 | Luo | H04W 36/305 370/331 |
| 2022/0322464 A1* | 10/2022 | Luo | H04W 36/0064 |

FOREIGN PATENT DOCUMENTS

| | | | |
|---|---|---|---|
| CN | 110636561 A | 12/2019 | |
| CN | 110636570 A | 12/2019 | |
| CN | 110831095 A | 2/2020 | |
| CN | 111093286 A | 5/2020 | |
| CN | 111148163 A | 5/2020 | |
| JP | 2021529472 A | 10/2021 | |
| WO | 2019246446 A1 | 12/2019 | |
| WO | 2020066605 A1 | 4/2020 | |
| WO | 2020067736 A1 | 4/2020 | |

OTHER PUBLICATIONS

ZTE, Sanechips, "Discussion on inter-CU IAB migration handling", 3GPP TSG RAN WG3 Meeting #106, Reno, USA, Nov. 2019, R3-196689, 4 Pages.

CATT, "(TP for NR_IAB BL CR for TS 38.401) Inter-CU IAB-node migration", 3GPP TSG-RAN WG3 #106, Reno, USA, Nov. 2019, R3-196959, 6 Pages.

Huawei, "Inter IAB donor-CU topology adaptation" 3GPP TSG-RAN WG3 Meeting #106, Reno, USA, Nov. 2019, R3-196995, 4 Pages.

LG Electronics "(TP for NR_IAB BL CR for TS 38.401): IAB-node migration between different IAB-donors", 3GPP TSG-RAN WG3 #106, Reno, USA, Nov. 2019, R3-197009, 6 Pages.

Huawei, "Inter IAB donor-CU topology adaptation", 3GPP TSG-RAN WG3 Meeting #107-e, E-meeting, Feb. 2020, R3-200763, 4 Pages.

International Search Report and Written Opinion for Application No. PCT /CN2021/098101, dated Aug. 30, 2021, 6 Pages.

First Office Action for Japanese Application No. 2022-572377, dated Jan. 4, 2024, 3 Pages.

Lenovo, et. al. "Backhaul link reselection" 3GPP TSG-RAN WG2 Meeting#102, Busan, Korea, May 2018, R2-1807902, 4 Pages.

First Office Action for Korean Application No. 10-2022-7040242, dated Jan. 22, 2025, 14 Pages.

3GPP "3rd Generation Partnership Project; Technical Specification Group Radio Access Network; NR; Study on Integrated Access and Backhaul; (Release 16)" 3GPP TR 38.874 V16.0.0 (Dec. 2018), 111 Pages.

AT&T "Enhancements to support NR backhaul links" 3GPP TSG RAN WG1 Meeting #95, Chengdu, China, Oct. 2018, R1-1812859, 13 Pages.

* cited by examiner

NETWORK MIGRATION METHOD, NETWORK MIGRATION APPARATUS, COMMUNICATION DEVICE, AND COMMUNICATION SYSTEM

CROSS-REFERENCE TO RELATED APPLICATIONS

This application is a continuation of International Application No. PCT/CN2021/098101 filed on Jun. 3, 2021, which claims priority to Chinese Patent Application No. 202010496964.5, filed on Jun. 3, 2020, which are incorporated herein by reference in their entireties.

TECHNICAL FIELD

This application belongs to the field of communication technologies, and specifically, relates to a network migration method, a network migration apparatus, a communication device, and a communication system.

BACKGROUND

An integrated access backhaul (IAB) system includes distributed unit (DU) functions and mobile termination (MT) functions. In an integrated access backhaul loop, DUs of all IAB nodes are connected to one centralized unit (CU) node, and the CU node performs DU and MT configuration.

When an IAB network (for example, including an IAB1 node, downstream nodes of the IAB1 node, and user equipment (UE)) migrates from a source network (that is, a network controlled by a source CU) to a target network (that is, a network controlled by a target CU), if an uppermost-stream IAB node (that is, the IAB1 node) in the IAB network migrates from the source network to the target network before the downstream nodes, the source CU cannot transmit a migration command to a migrating downstream node after the most upstream IAB node completes migration, resulting that the downstream node cannot migrate to the target network.

SUMMARY

The objective of embodiments of this application is to provide a network migration method, a network migration apparatus, a communication device, and a communication system.

To resolve the foregoing technical problem, this application is implemented as follows.

According to a first aspect, a network migration method is provided, applied to a first IAB node in a migrating IAB network. The network migration method includes: implementing a migration procedure of the first IAB node according to a received first migration command in a case that a target migration command has been transmitted to a target network node. The target network node is a downstream child IAB node of the first IAB node or UE served by the first IAB node in the IAB network, the target migration command includes migration commands corresponding to all downstream network nodes of the first IAB node in the IAB network, and the first migration command is a migration command corresponding to the first IAB node.

According to a second aspect, a network migration method is provided, applied to a source CU. The network migration method includes: transmitting a first migration command and a target migration command to a first IAB node in a migrating IAB network, where the first migration command is a migration command corresponding to the first IAB node, and the target migration command includes migration commands corresponding to all downstream network nodes of the first IAB node in the IAB network. The first migration command is used by the first IAB node to implement a migration procedure of the first IAB node in a case that the target migration command has been transmitted to a target network node, where the target network node is a downstream child IAB node of the first IAB node or UE served by the first IAB node in the IAB network.

According to a third aspect, a network migration apparatus is provided. The network migration apparatus includes an implementing module. The implementing module is configured to implement a migration procedure of a first IAB node in a migrating IAB network according to a received first migration command in a case that a target migration command has been transmitted to a target network node. The target network node is a downstream child IAB node of the first IAB node or UE served by the first IAB node in the IAB network, the target migration command includes migration commands corresponding to all downstream network nodes of the first IAB node in the IAB network, and the first migration command is a migration command corresponding to the first IAB node.

According to a fourth aspect, a network migration apparatus is provided. The network migration apparatus includes a transmitting module. The transmitting module is configured to transmit a first migration command and a target migration command to a first IAB node in a migrating IAB network, where the first migration command is a migration command corresponding to the first IAB node, and the target migration command includes migration commands corresponding to all downstream network nodes of the first IAB node in the IAB network. The first migration command is used by the first IAB node to implement a migration procedure of the first IAB node in a case that the target migration command has been transmitted to a target network node, where the target network node is a downstream child IAB node of the first IAB node or UE served by the first IAB node in the IAB network.

According to a fifth aspect, an IAB node is provided. The IAB node includes a processor, a memory, and a program or instructions stored in the memory and capable of running on the processor, and when the program or the instructions are executed by the processor, the steps of the network migration method according to the first aspect are implemented.

According to a sixth aspect, a CU is provided. The CU includes a processor, a memory, and a program or instructions stored in the memory and capable of running on the processor, and when the program or the instructions are executed by the processor, the steps of the network migration method according to the second aspect are implemented.

According to a seventh aspect, a communication system is provided. The communication system includes the network migration apparatus according to the third aspect and the network migration apparatus according to the fourth aspect; or the communication system includes the IAB node according to the fifth aspect and the CU according to the sixth aspect.

According to an eighth aspect, a readable storage medium is provided. The readable storage medium stores a program or instructions, and when the program or the instructions are executed by a processor, the steps of the network migration method according to the first aspect are implemented, or the steps of the network migration method according to the second aspect are implemented.

According to a ninth aspect, a chip is provided. The chip includes a processor and a communication interface, the communication interface is coupled to the processor, and the processor is configured to run a program or instructions to implement the network migration method according to the first aspect or the network migration method according to the second aspect.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that data used in this way is used interchangeably in appropriate circumstances so that the embodiments of this application can be implemented in other orders than the order illustrated or described herein. In addition, objects differentiated by "first" and "second" are usually of a same type. The number of objects is not limited. For example, a first object may indicate one or more objects. In addition, in this specification and claims, "and/or" represents at least one of connected objects, and the symbol "/" generally represents an "or" relationship between the associated objects.

Some concepts and/or terms used in the network migration method, the network migration apparatus, the communication device, and the communication system that are provided in the embodiments of this application are explained below.

Figure 1:
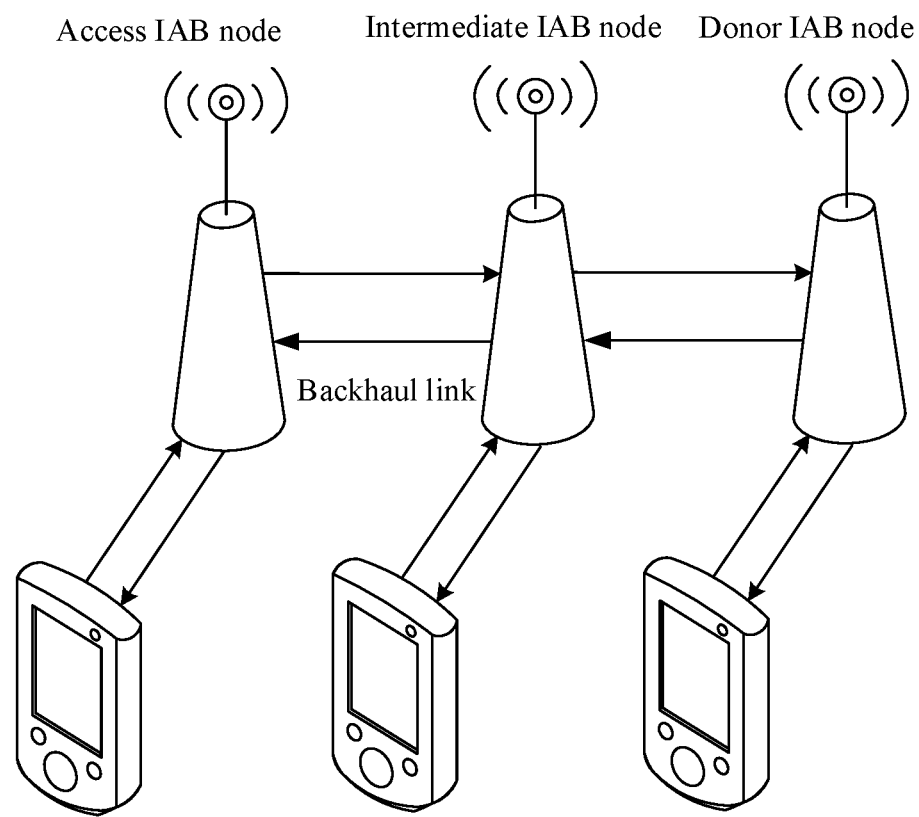
FIG. 1 is a schematic diagram of an architecture of an IAB system according to an embodiment of this application.

IAB system: FIG. 1 is a schematic architectural diagram of an IAB system. An IAB node includes a DU function and an MT function. Depending on an MT, one access point (that is, the IAB node) can find an upstream access point (parent IAB node) and establish a wireless connection with a DU of the upstream access point. The wireless connection is referred to as a wireless backhaul link. After the IAB node establishes a complete backhaul link, the IAB node enables its DU function, and the DU provides a cell service, that is, the DU can provide an access service for user equipment (UE). An integrated access backhaul loop includes one donor IAB node (or referred to as an IAB donor), and the donor IAB node has a directly connected wired transmission network. The IAB system is introduced for a case that no wired transmission network is deployed when access points are densely deployed, that is, in absence of a wired transmission network, access points can depend on wireless backhaul.

The UE may also be referred to as a terminal device. The UE may be a terminal-side device such as a mobile phone, a tablet personal computer, a laptop computer or a notebook computer, a personal digital assistant (PDA), a handheld computer, a netbook, an ultra-mobile personal computer (UMPC), a mobile internet device (MID), a wearable device, vehicle user equipment (VUE), or pedestrian user equipment (PUE). The wearable device includes a wristband, earphones, glasses, or the like. It should be noted that the UE is not limited to a specific type in the embodiments of this application.

It should be noted that the technologies described in the embodiments of this application are not limited to long term evolution (LTE)/LTE-advanced (LTE-A) systems, and may also be used in other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably. The technology described herein may be used in the foregoing systems and radio technologies as well as other systems and radio technologies. However, in the following descriptions, a new radio (NR) system is described for an illustration purpose, and NR terms are used in most of the following descriptions, although these technologies may also be applied to other applications than an NR system application, for example, 6th generation (6G) communication systems.

Figure 2:
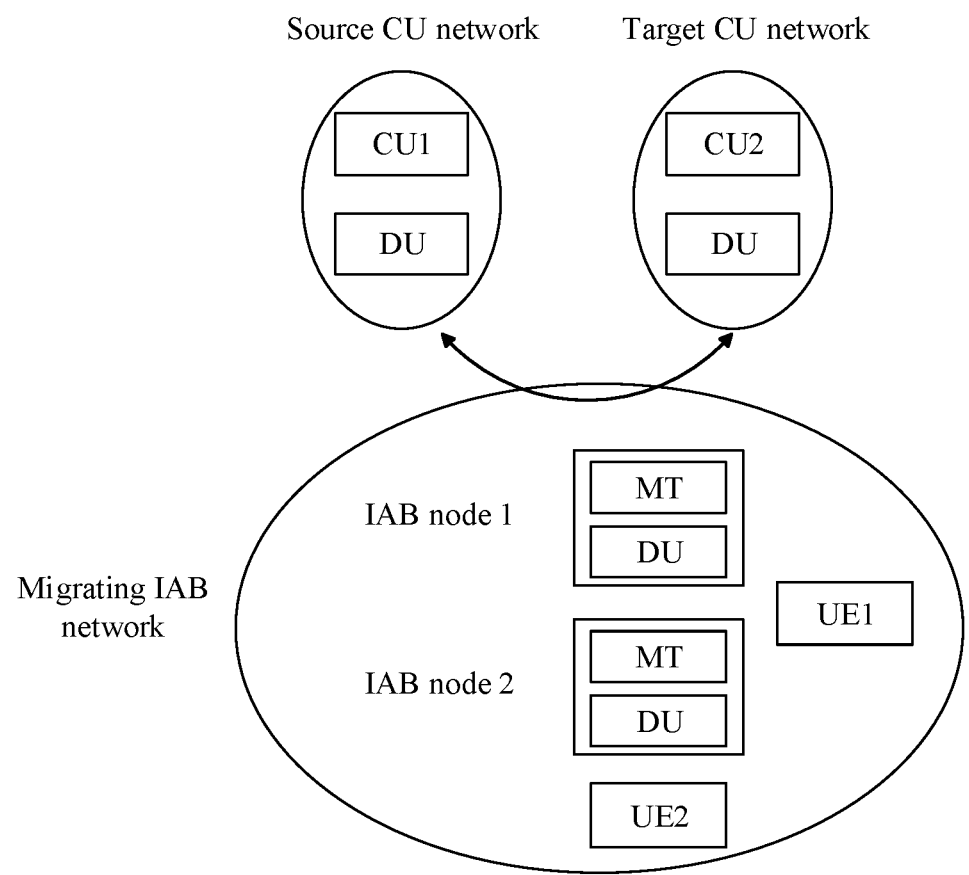
FIG. 2 is a schematic structural diagram of a source CU network migrating to a target CU network according to an embodiment of this application.

FIG. 2 is a schematic structural diagram of a migrating IAB network migrating from a source CU network to a target CU network. As shown in FIG. 2, the IAB network includes an IAB node 1, all downstream nodes (for example, an IAB node 2), UE (for example, UE 1 and UE 2), and so on. A source donor IAB node corresponding to the source CU network includes a CU 1 and a DU, and a target donor IAB node corresponding to the target CU network includes a CU 2 and a DU.

In the embodiments of this application, the source CU may transmit migration commands for nodes to the IAB node 1 so that the IAB node 1 forwards migration commands for downstream nodes (for example, the IAB node 2 and the UE).

Figure 3:
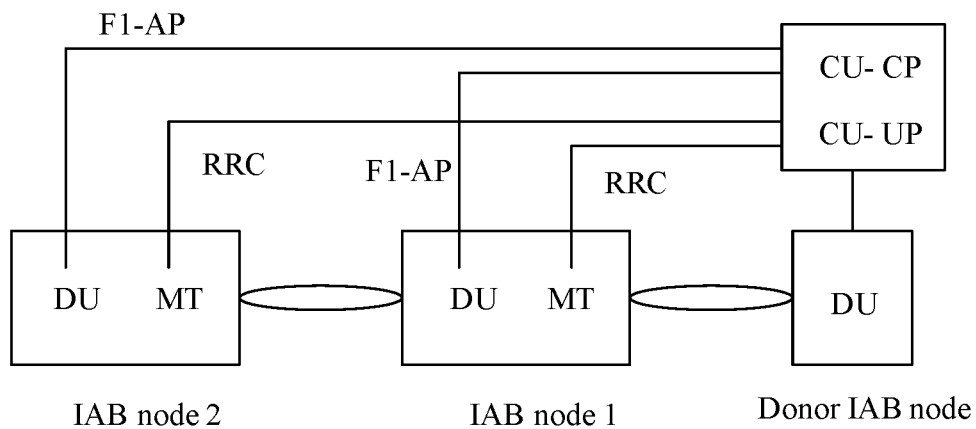
FIG. 3 is a schematic diagram of a CU-DU structure of an IAB system according to an embodiment of this application.

FIG. 3 is a schematic diagram of a CU-DU structure of an IAB system. In an integrated access backhaul loop, DUs of all IAB nodes are connected to one CU node, and that one CU node makes configurations for the DUs through F1 application protocol (F1-AP) signaling. The CU makes configurations for MTs through RRC signaling. A donor IAB node has no MT function.

The following details the network migration methods provided in the embodiments of this application through specific embodiments and application scenarios thereof with reference to the accompanying drawings.

Figure 4:
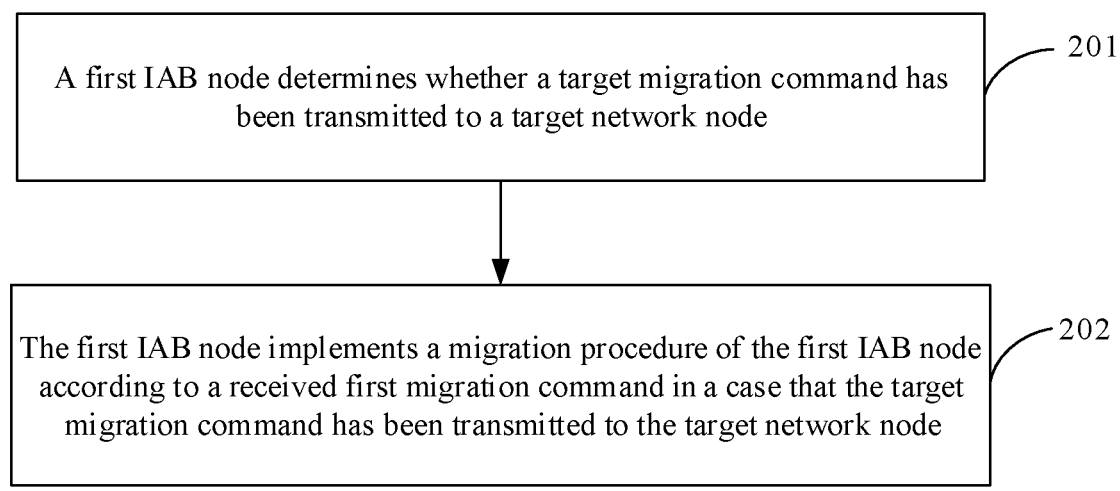
FIG. 4 is a first schematic diagram of a network migration method according to an embodiment of this application.

Based on the foregoing communication system, an embodiment of this application provides a network migration method. As shown in FIG. 4, the network migration method may include the following step 201 and step 202:

Step 201. A first IAB node determines whether a target migration command has been transmitted to a target network node.

Step 202. The first IAB node implements a migration procedure of the first IAB node according to a received first migration command in a case that the target migration command has been transmitted to the target network node.

In this embodiment of this application, the first IAB node is any IAB node in a migrating IAB network. The target network node is a downstream child IAB node of the first IAB node or UE served by the first IAB node in the IAB network, the target migration command includes migration commands corresponding to all downstream network nodes of the first IAB node in the IAB network, and the first migration command is a migration command corresponding to the first IAB node.

In this embodiment of this application, the migrating IAB network includes multiple migrating network nodes, and the multiple network nodes may be multiple IAB nodes, or include at least one IAB node and UE.

Optionally, in this embodiment of this application, the first IAB node may be an uppermost-stream network node in the IAB network, or the first IAB node may be any downstream IAB node in the IAB network.

It can be understood that if the first IAB node is an uppermost-stream network node in the IAB network, the target migration command is a migration command other than the first migration command in all migration commands, and the all migration commands are migration commands corresponding to all network nodes in the IAB network. If the first IAB node is any downstream IAB node in the IAB network, the target migration command includes migration commands corresponding to all downstream network nodes of the IAB node.

It should be noted that the first IAB node being any downstream IAB node in the IAB network can be understood as the first IAB node being any downstream IAB node of an uppermost-stream IAB node (that is, an uppermost-stream network node in the IAB network).

Optionally, in this embodiment of this application, the target network node may be an IAB node in the IAB network, or may be a UE in the IAB network.

Optionally, in this embodiment of this application, in a case that the first IAB node is an uppermost-stream network node in the IAB network, the first migration command is directly transmitted by a source CU to the first IAB node. It can be understood that in this case, the target migration command is also directly transmitted by the source CU to the first IAB node.

Optionally, in this embodiment of this application, when the first IAB node is any downstream IAB node in the IAB network, the first migration command is forwarded by a source CU to the first IAB node via an upstream network node of the first IAB node. It can be understood that in this case, the target migration command is also forwarded by the source CU to the first IAB node via the upstream network node of the first IAB node.

In this embodiment of this application, the source CU may generate corresponding migration request messages for all network nodes in the migrating IAB network, and transmit these migration request messages (each migration request message includes context information of a corresponding migrating network node) to a target CU. After receiving the migration request message of each migrating network node, the target CU establishes, based on the context information carried in the migration request message, an environment serving the migrating network node, for example, establishing a bearer, configuring a radio resource, and configuring a backhaul path. Then, the target CU may generate a migration command for the migrating network node, and transmit the migration command to the source CU, so that the source CU can forward, after receiving migration commands corresponding to all the network nodes in the migrating IAB network, the migration commands corresponding to all the network nodes to the IAB network (that is, each network node in the IAB network).

Figure 5:
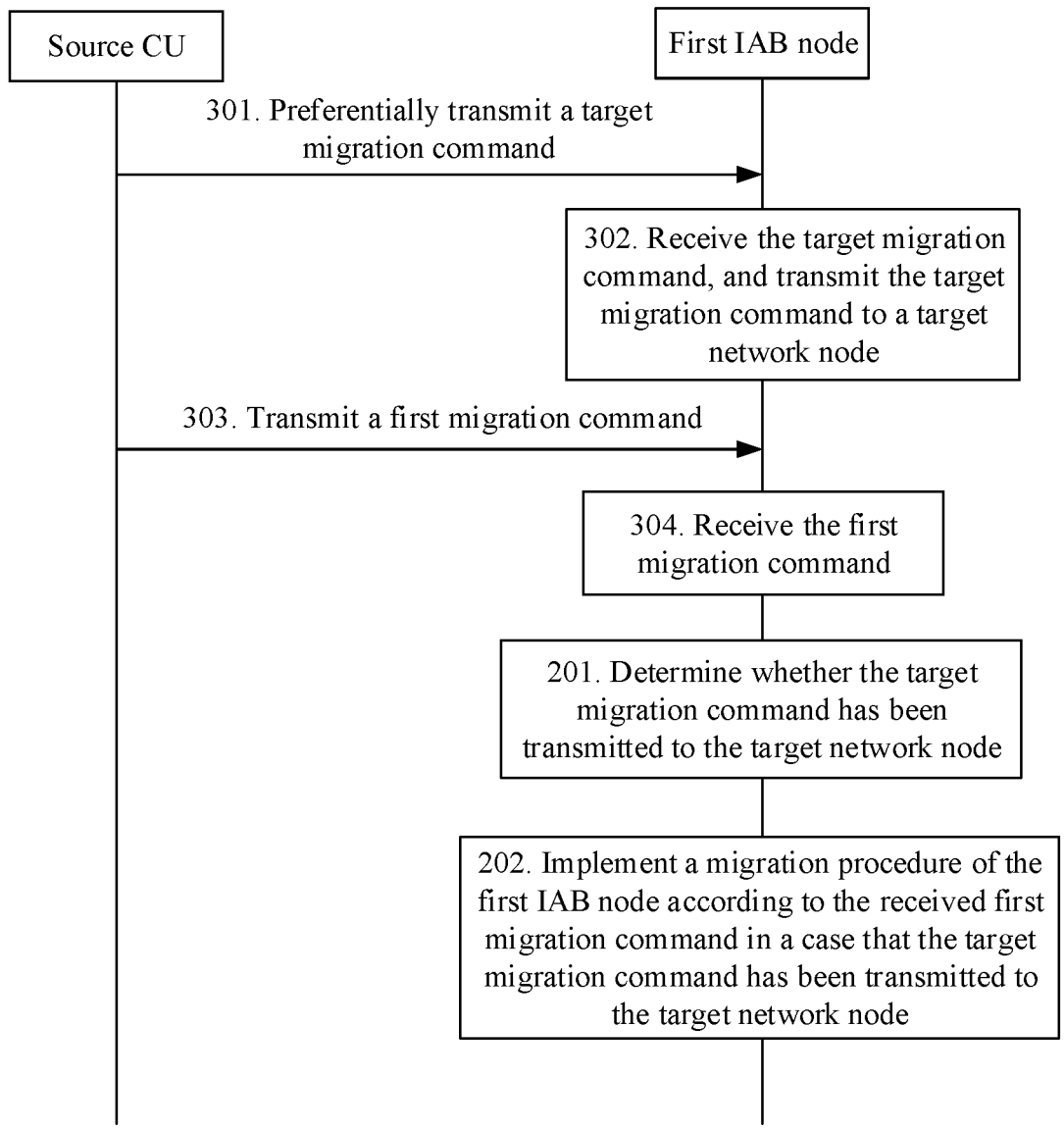
FIG. 5 is a second schematic diagram of a network migration method according to an embodiment of this application.

Optionally, in an implementation of this embodiment of this application, the first IAB node is an uppermost-stream network node in the IAB network. With reference to FIG. 4, as shown in FIG. 5, before step 201, the network migration method provided in this embodiment of this application further includes the following steps 301 to 304.

Step 301. The source CU preferentially transmits the target migration command to the first IAB node.

In this embodiment of this application, the source CU may preferentially transmit a migration command (that is, the target migration command) for each downstream network node (a network node other than the uppermost-stream IAB node in the IAB network) to the uppermost-stream IAB node in the IAB network, so that the uppermost-stream IAB node can preferentially transmit the target migration command to a downstream network node (for example, the child IAB node or the UE served by the first IAB node).

Step 302. The first IAB node receives the target migration command from the source CU, and transmits the target migration command to the target network node.

Step 303. The source CU transmits the first migration command to the first IAB node.

Step 304. The first IAB node receives the first migration command from the source CU.

In this implementation of this embodiment of this application, the source CU transmits the migration commands in a different order to enable an IAB node in the migrating IAB network to determine that the migration commands have been successfully forwarded to all downstream nodes. Specifically, the source CU first transmits the migration commands for all the downstream nodes of the IAB node, and transmits the migration command for the IAB node at last. When receiving its own migration command, the IAB node determines that all the migration commands for the downstream nodes have been transmitted, and therefore can start a migration procedure of the IAB node. According to this method, a migrating IAB node does not need to determine whether migration commands for all downstream IAB nodes have been transmitted, and no new signaling needs to be defined.

It can be understood that the source CU may preferentially transmit the migration commands for all the downstream network nodes, so as to transmit the migration command for the uppermost-stream IAB node (that is, the first migration command) to the uppermost-stream IAB node after the uppermost-stream IAB node finishes transmitting the migration commands for all the downstream network nodes. In other words, the uppermost-stream IAB node forwards the migration commands for the downstream network nodes before implementing network migration. This can avoid a problem that a migration command cannot be transmitted to a downstream network node if the uppermost-stream TAB node implements network migration after receiving its migration command, so that the downstream node can migrate to the target network.

Figure 6:
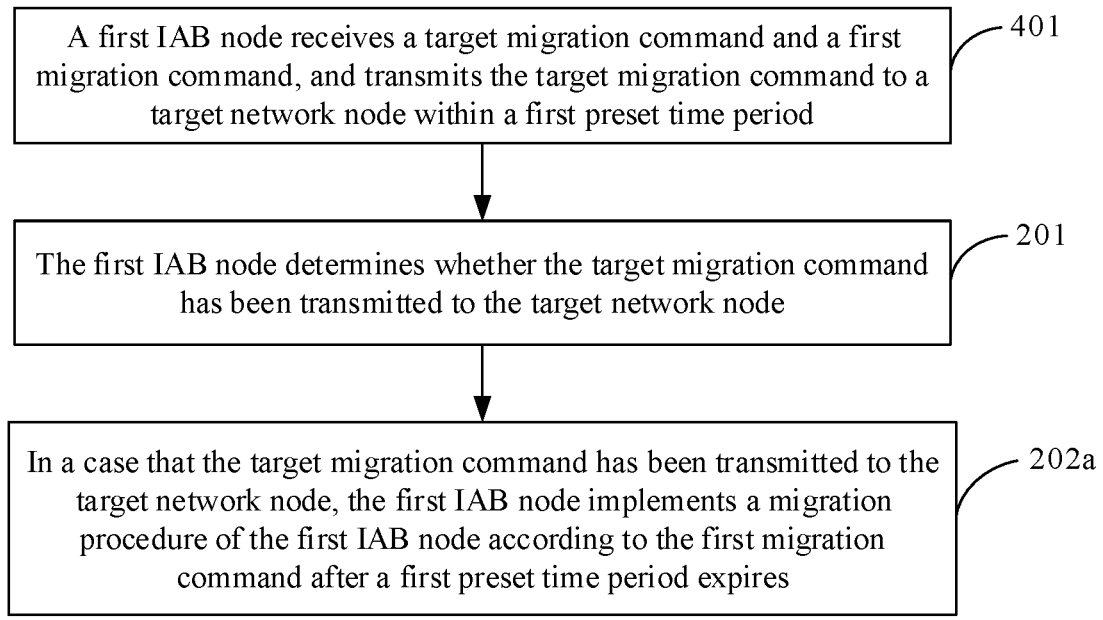
FIG. 6 is a third schematic diagram of a network migration method according to an embodiment of this application.

Optionally, in another implementation of this embodiment of this application, with reference to FIG. 4, as shown in FIG. 6, before step 201, the network migration method provided in this embodiment of this application further includes the following step 401, and step 202 may be specifically implemented through the following step 202a.

Step 401. The first TAB node receives the target migration command and the first migration command, and transmits the target migration command to the target network node within a first preset time period.

In this embodiment of this application, the first preset time period is a preset time period starting from a moment when the target migration command and the first migration command are received.

It should be noted that if the first TAB node is an uppermost-stream network node in the TAB network, the target migration command and the first migration command are directly transmitted by the source CU to the first TAB node. If the first TAB node is any downstream TAB node in the IAB network, the target migration command and the first migration command are forwarded to the first IAB node by an upstream network node of the first IAB node.

In this embodiment of this application, after receiving the first migration command, the first IAB node does not implement the migration procedure of the first IAB node within the first preset time period, but forwards the target migration command.

Step 202a. In a case that the target migration command has been transmitted to the target network node, the first IAB node implements the migration procedure of the first IAB node according to the first migration command after the first preset time period expires.

In this implementation of this embodiment of this application, a timing method is used to cause an IAB node in the migrating IAB network to determine that the migration commands have been successfully forwarded to all downstream nodes. Specifically, the source CU first transmits a migration command for each IAB node. When receiving its own migration command, a migrating IAB node waits for a time period (a timer may be preconfigured), and does not start a migration procedure during this time period. During the waiting time, the source CU can continue to forward a migration command for a downstream IAB node via the migrating IAB node. After the waiting time expires, the migrating IAB node starts its own migration procedure. Herein, the waiting time is time reserved for forwarding the migration command for the downstream node. The waiting time may be configured through RRC signaling.

It can be understood that after receiving the target migration command and the first migration command, the first IAB node may finish forwarding the target migration command within the first preset time period, and then implement the migration procedure of the first IAB node after the first preset time period expires. That is, the first IAB node does not implement the migration procedure within the first preset time period. Therefore, it can be avoided that the migration command cannot be transmitted to the downstream node if the first IAB node performs network migration after receiving the first migration command, so that the downstream network node can migrate to the target network.

Figure 7:
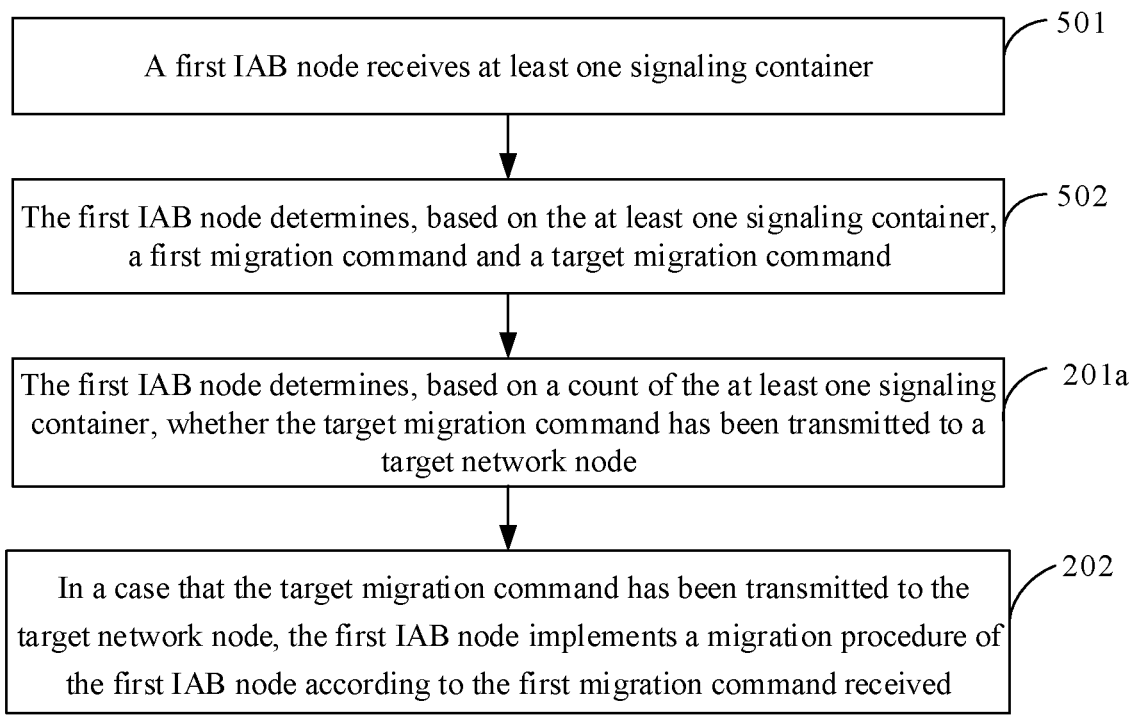
FIG. 7 is a fourth schematic diagram of a network migration method according to an embodiment of this application.

Optionally, in still another implementation of this embodiment of this application, with reference to FIG. 4, as shown in FIG. 7, before step 201, the network migration method provided in this embodiment of this application further includes the following step 501 and step 502, and step 201 may be specifically implemented through the following step 201a.

Step 501. The first TAB node receives at least one signaling container.

In this embodiment of this application, each of the at least one signaling container includes a migration command corresponding to one network node in the TAB network, and the at least one signaling container is directly transmitted by the source CU to the first TAB node or forwarded by the source CU to the first TAB node via an upstream network node of the first TAB node.

It should be noted that if the first TAB node is an uppermost-stream network node in the TAB network, the at least one signaling container is directly transmitted by the source CU to the first TAB node. If the first TAB node is any downstream TAB node in the TAB network, the at least one signaling container is forwarded to the first TAB node by an upstream network node of the first TAB node.

Optionally, in this embodiment of this application, each signaling container may be a radio resource control (RRC) signaling container or an F1 application protocol (F1-AP) signaling container.

Step 502. The first TAB node determines, based on the at least one signaling container, the first migration command and the target migration command.

In this embodiment of this application, after receiving the at least one signaling container, the first TAB node may obtain/fetch a corresponding migration command from each of the at least one signaling container, so as to obtain the first migration command and the target migration command, and determine a to-be-forwarded migration command by identifying each signaling container.

Step 201a. The first TAB node determines, based on a count of the at least one signaling container, whether the target migration command has been transmitted to the target network node.

In this embodiment of this application, after the first IAB node determines the to-be-forwarded migration command by identifying the at least one signaling container, the first IAB node may count the signaling container corresponding to the to-be-forwarded migration command so as to determine whether the migration commands for all the downstream nodes have been forwarded.

In this implementation of this embodiment of this application, a signaling container—based method is used to cause an IAB node in the migrating IAB network to determine that migration commands for all downstream nodes have been successfully forwarded. Specifically, when forwarding a migration command, the source CU transmits received migration commands for nodes in the migrating IAB network by using RRC signaling containers or F1-AP signaling containers. Based on the signaling containers, a migrating IAB node identifies and counts to-be-forwarded migration command so as to determine whether migration commands for all downstream nodes have all been forwarded.

It can be understood that the first IAB node can determine, based on the count of the at least one signaling container, whether the target migration command has been transmitted to the target network node, and implements the migration procedure of the first IAB node in a case that the first IAB node determines that the target migration command has been transmitted. Therefore, it can be avoided that the migration command cannot be transmitted to the downstream network node if the first IAB node performs network migration when the migration command has not been forwarded to the downstream network node. This ensures that the downstream node can migrate to the target network.

According to the network migration method provided in this embodiment of this application, the first IAB node implements the migration procedure of the first IAB node according to the received first migration command in a case that the target migration command has been transmitted to the target network node. The first IAB node implements the migration procedure of the first IAB node only after determining that a corresponding migration command has been transmitted to a downstream network node. Therefore, it can be avoided that the migration command cannot be transmitted to the downstream network node if the first IAB node performs network migration when the migration command has not been forwarded to the downstream network node. This ensures that the downstream network node can migrate to a target network in a timely manner.

Figure 8:
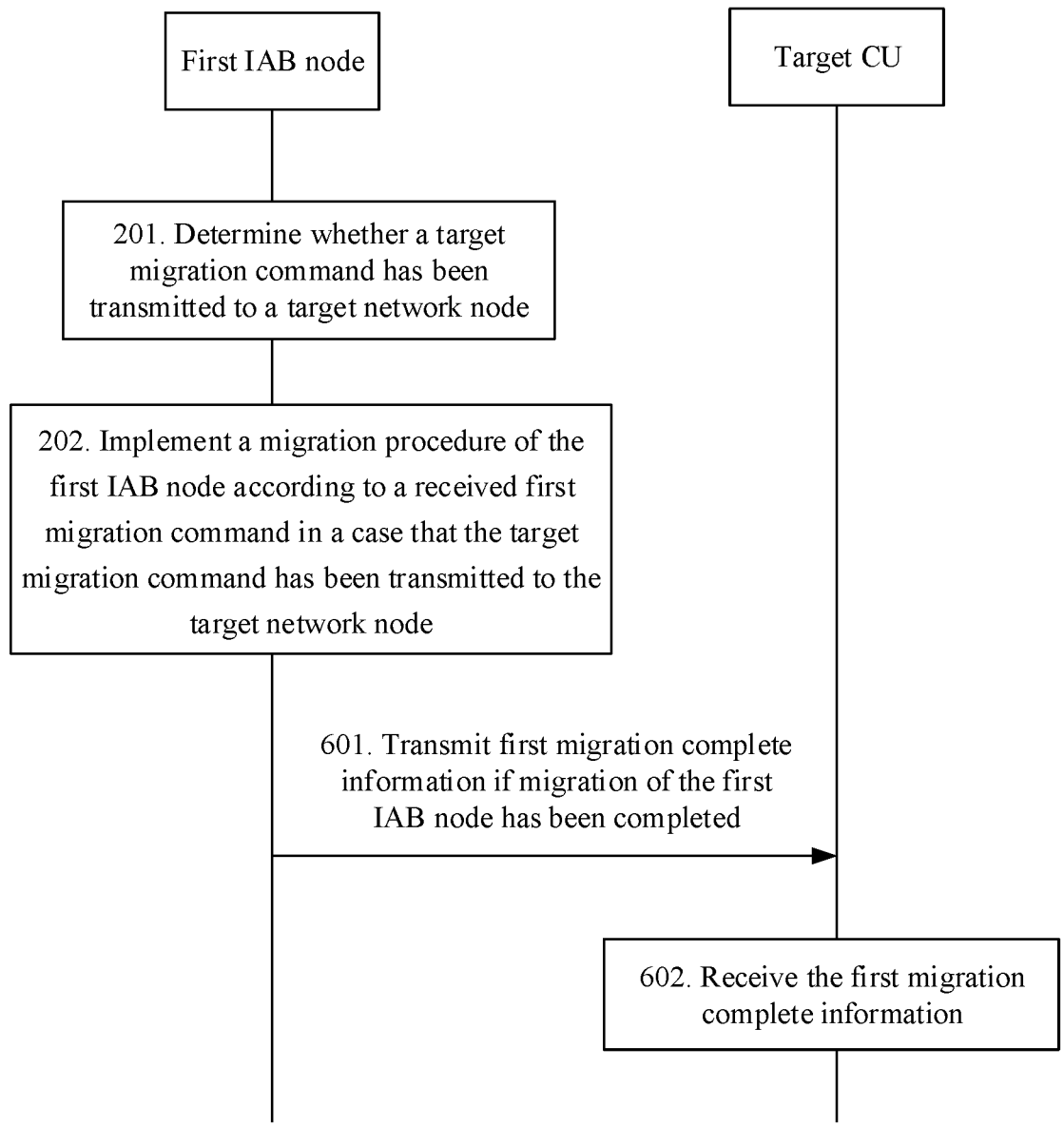
FIG. 8 is a fifth schematic diagram of a network migration method according to an embodiment of this application.

Optionally, in this embodiment of this application, with reference to FIG. 4, as shown in FIG. 8, after step 202, the network migration method provided in this embodiment of this application further includes the following step 601 and step 602.

Step 601. The first IAB node transmits first migration complete information to the target CU if migration of the first IAB node has been completed.

In this embodiment of this application, the first migration complete information is used to indicate that migration of the first IAB node has been completed.

Step 602. The target CU receives the first migration complete information from the first IAB node.

In this embodiment of this application, after completing the network migration, the first IAB node may transmit the migration complete information to the target CU to indicate to the target CU that migration of the first IAB node has been completed.

Optionally, in this embodiment of this application, after step 202, the network migration method provided in this embodiment of this application further includes the following step 701 (or step 702) and step 703.

Step 701. In a case that RRC signaling from the target network node has been received, the first IAB node transmits the RRC signaling to the target CU if migration of the first IAB node has been completed.

Step 702. In a case that RRC signaling from the target network node has been received, the first IAB node caches the RRC signaling if migration of the first IAB node has not been completed, and transmits the RRC signaling to the target CU after migration of the first IAB node has been completed.

In this embodiment of this application, after completing migration of the first IAB node, the first IAB node may transmit the first migration complete information and the RRC signaling to the target CU.

Optionally, in this embodiment of this application, the first IAB node may cache all RRC signaling from downstream network nodes, and after migration of the first IAB node is completed, forward all the cached RRC signaling to the target CU. According to this method, the first IAB node forwards some RRC signaling that should have been transmitted to the source CU to the target CU, and the target CU discards such RRC signaling after receiving it. The advantage of this method lies in low complexity.

Step 703. The target CU receives the RRC signaling from the first IAB node.

Optionally, in this embodiment of this application, the RRC signaling includes second migration complete information of the target network node, and the second migration complete information is used to indicate that migration of the target network node has been completed.

Optionally, in this embodiment of this application, the second migration complete information is information carried in a specific radio link control (Radio Link Control, RLC) channel.

Optionally, in this embodiment of this application, the migration complete information may be transmitted on a specific RLC channel. For example, the target CU reconfigures an LCD of an LCH corresponding to a signaling resource bearer (SRB). In this way, the first IAB node needs to cache only RRC information/signaling transmitted on that LCH. The first IAB node regards RRC information received on an LCH (configured by the source CU) corresponding to an original SRB as RRC information transmitted to the source CU. Since a connection to the source CU is lost after the migration, such RRC signaling is directly discarded. According to this method, an LCH corresponding to an SRB can be reconfigured by the target CU so that the first IAB node can distinguish between information for the source CU and information for the target CU based on LCIDs.

An embodiment of this application provides a network migration method, applied to a source CU. The network migration method may include the following step 801 and step 802.

Step 801. The source CU transmits a first migration command and a target migration command to a first IAB node in a migrating IAB network.

In this embodiment of this application, the first migration command is a migration command corresponding to the first IAB node, and the target migration command includes migration commands corresponding to all downstream network nodes of the first IAB node in the IAB network. The first migration command is used by the first IAB node to implement a migration procedure of the first IAB node in a case that the target migration command has been transmitted to a target network node, where the target network node is a downstream child IAB node of the first IAB node or UE served by the first IAB node in the IAB network.

Optionally, in this embodiment of this application, the first IAB node is an uppermost-stream network node in the IAB network. The foregoing step 801 may be specifically implemented by using the following step 801a.

Step 801a. The source CU preferentially transmits the target migration command to the first IAB node, and then transmits the first migration command to the first IAB node.

Optionally, in this embodiment of this application, step 801 may be specifically implemented in the following step 801b.

Step 801b. The source CU transmits at least one signaling container to the first IAB node.

In this embodiment of this application, each of the at least one signaling container includes a migration command corresponding to one network node in the IAB network, and the at least one signaling container is directly transmitted by the source CU to the first IAB node or forwarded by the source CU to the first IAB node via an upstream network node of the first IAB node.

In this embodiment of this application, the source CU may transmit the target migration command and the first migration command to the first IAB node, to enable the first IAB node to implement the migration procedure of the first IAB node in a case that the target migration command has been transmitted to the target network node. Therefore, it can be avoided that the migration command cannot be transmitted to the downstream network node if the first IAB node performs network migration when the migration command has not been forwarded to the downstream network node. This ensures that the downstream network node can migrate to the target network in a timely manner.

It should be noted that for description related to step 801 to step 802, reference may be made to the description in the foregoing embodiment. Details are not described herein again.

The following describes a procedure of an IAB network migrating from a source CU network to a target CU network according to an embodiment of this application with specific embodiments (that is, the following step 1 to step 12).

Step 1. A source CU generates migration request messages for all network nodes (IAB nodes or UE) in a migrating IAB network, and transmits the migration request messages to a target CU, where each migration request message includes context information of a corresponding migrating network node.

Step 2. After receiving the migration request message of each network node in the IAB network, the target CU establishes, based on the context information carried in the migration request message, an environment serving the network node, for example, establishing a bearer, configuring a radio resource, and configuring a backhaul path.

Step 3. The target CU generates a migration command (or referred to as a migration response message) for each network node, and transmits the migration command for the network node to the source CU.

Step 4. After receiving the migration command for each network node, the source CU transmits all migration commands to an uppermost-stream IAB node in the IAB network (for example, an IAB node 1 in FIG. 4) via a parent IAB-DU of the uppermost-stream IAB node in the IAB network.

Step 5. After receiving the migration command for each network node, the uppermost-stream IAB node in the IAB network determines that the migration commands for all the network nodes have been received.

Step 6. The uppermost-stream IAB node forwards all migration commands for downstream nodes to the downstream nodes (for example, an IAB node 2 in FIG. 4), and then performs the following step 8.

Step 7. After receiving all the migration commands, a migrating child IAB node in the downstream forwards all migration commands for downstream child nodes to the downstream nodes, and then performs the following step 8x.

Step 8. The uppermost-stream IAB node completes migration preconfiguration according to a migration command for the uppermost-stream IAB node.

Step 8x. A child node of the uppermost-stream IAB node (for example, the IAB node 2) performs preconfiguration according to a migration command for the child node.

Step 9. The uppermost-stream IAB node in the IAB network establishes a wireless connection and a backhaul path to the target CU network according to the migration command.

It should be noted that there is no specific sequence relationship between step 7, step 8, step 8x, and step 9. In other words, an execution order of these four steps is not limited in the embodiment of this application.

Step 10. After completing reconfiguration according to the migration command, the child node (for example, the IAB node 2) of the uppermost-stream IAB node transmits migration complete information to the target CU via the uppermost-stream IAB node.

Step 11. After receiving the migration complete information, the uppermost-stream IAB node caches the migration complete information if the IAB node 1 has not successfully migrated.

Step 12. After completing migration, the IAB node 1 transmits the received migration complete information of the downstream node to the target CU.

It should be noted that if the IAB node 1 has completed the migration, the IAB node 1 directly forwards the migration complete information received from the downstream node, without performing step 11.

Figure 9:
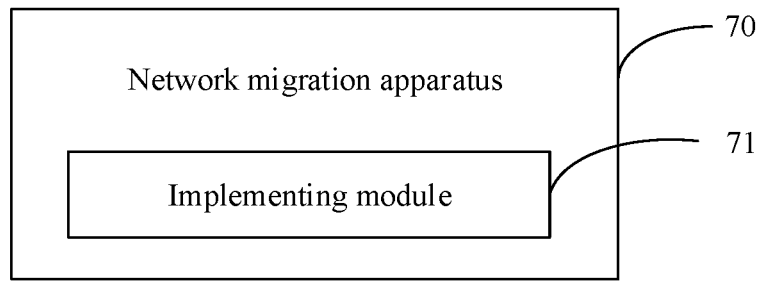
FIG. 9 is a first schematic structural diagram of a network migration apparatus according to an embodiment of this application.

FIG. 9 is a possible schematic structural diagram of a network migration apparatus according to an embodiment of this application. As shown in FIG. 9, the network migration apparatus 70 provided in this embodiment of this application may include an implementing module 71.

The implementing module 71 is configured to implement a migration procedure of a first IAB node in a migrating IAB network according to a received first migration command in a case that a target migration command has been transmitted to a target network node. The target network node is a downstream child IAB node of the first IAB node or UE served by the first IAB node in the IAB network, the target migration command includes migration commands corresponding to all downstream network nodes of the first IAB node in the IAB network, and the first migration command is a migration command corresponding to the first IAB node.

In a possible implementation, in a case that the first IAB node is an uppermost-stream network node in the IAB network, the first migration command is directly transmitted by a source CU to the first IAB node. In a case that the first IAB node is any downstream IAB node in the IAB network, the first migration command is forwarded by a source CU to the first IAB node via an upstream network node of the first IAB node.

Figure 10:
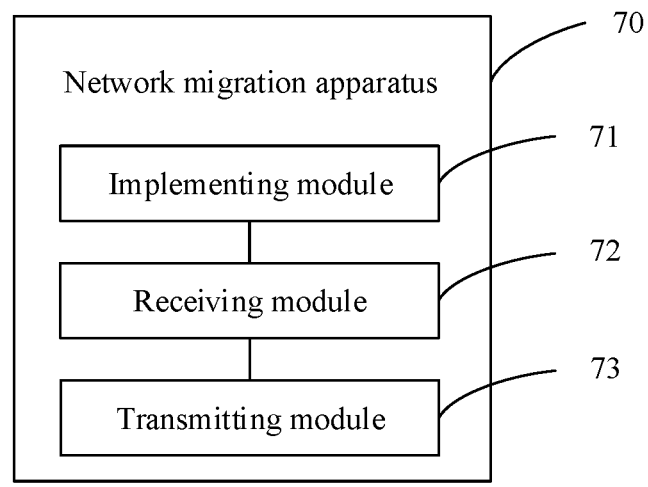
FIG. 10 is a second schematic structural diagram of a network migration apparatus according to an embodiment of this application.

In a possible implementation, the first IAB node is an uppermost-stream network node in the IAB network. With reference to FIG. 9, as shown in FIG. 10, the network migration apparatus 70 provided in this embodiment of this application may further include a receiving module 72 and a transmitting module 73. The receiving module 72 is configured to receive the target migration command from the source CU, before the implementing module 71 implements the migration procedure of the first IAB node according to the received first migration command in a case that the target migration command has been transmitted to the target network node. The transmitting module 73 is configured to transmit the target migration command to the target network node. The receiving module 72 is further configured to receive the first migration command from the source CU.

In a possible implementation, with reference to FIG. 9, as shown in FIG. 10, the network migration apparatus 70 provided in this embodiment of this application may further include a receiving module 72 and a transmitting module 73. The receiving module 72 is configured to receive the target migration command and the first migration command, before the implementing module 71 implements the migration procedure of the first IAB node according to the received first migration command in a case that the target migration command has been transmitted to the target network node. The transmitting module 73 is configured to transmit the target migration command to the target network node within a first preset time period, where the first preset time period is a preset time period starting from a moment when the target migration command and the first migration command are received. The implementing module 71 is specifically configured to implement the migration procedure of the first IAB node according to the first migration command after the first preset time period expires.

Figure 11:
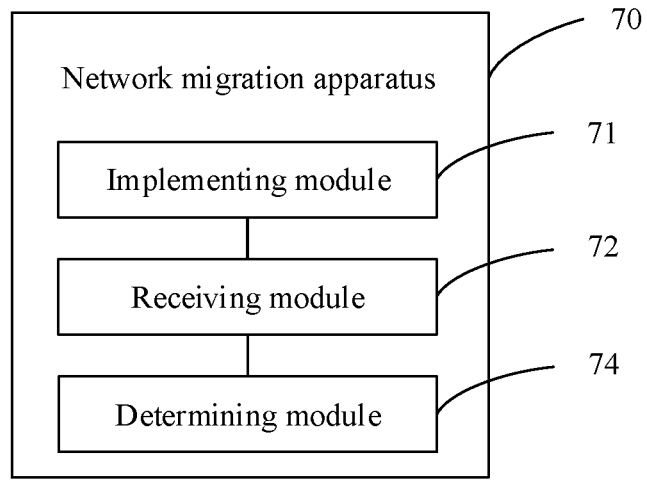
FIG. 11 is a third schematic structural diagram of a network migration apparatus according to an embodiment of this application.

In a possible implementation, with reference to FIG. 9, as shown in FIG. 11, the network migration apparatus 70 provided in this embodiment of this application may further include a receiving module 72 and a determining module 74. The receiving module 72 is configured to receive at least one signaling container, before the implementing module 71 implements the migration procedure of the first IAB node according to the received first migration command in a case that the target migration command has been transmitted to the target network node, where each signaling container includes a migration command corresponding to one network node in the IAB network, and the at least one signaling container is directly transmitted by the source CU to the first IAB node or forwarded by the source CU to the first IAB node via an upstream network node of the first IAB node. The determining module 74 is configured to determine, based on the at least one signaling container, the first migration command and the target migration command, and determine, based on a count of the at least one signaling container, whether the target migration command has been transmitted to the target network node. Each signaling container is an RRC signaling container or an F1-AP signaling container.

In a possible implementation, the network migration apparatus 70 provided in this embodiment of this application may further include a transmitting module 73. The transmitting module 73 is configured to: after the implementing module 71 implements the migration procedure of the first IAB node, transmit first migration complete information to a target CU if migration of the first IAB node has been completed, where the first migration complete information is used to indicate that migration of the first IAB node has been completed.

In a possible implementation, the network migration apparatus 70 provided in this embodiment of this application may further include a transmitting module 73. The transmitting module 73 is configured to: after the implementing module 71 implements the migration procedure of the first IAB node, in a case that RRC signaling from the target network node has been received, transmit the RRC signaling to a target CU if migration of the first IAB node has been completed.

In a possible implementation, the network migration apparatus 70 provided in this embodiment of this application may further include a caching module and a transmitting module 73. The caching module is configured to: in a case that RRC signaling from the target network node has been received, cache the RRC signaling if migration of the first IAB node has not been completed. The transmitting module 73 is configured to transmit the RRC signaling to a target CU after migration of the first IAB node has been completed.

In a possible implementation, the RRC signaling includes second migration complete information of the target network node, and the second migration complete information is used to indicate that migration of the target network node has been completed.

In a possible implementation, the second migration complete information is information carried in a specific RLC channel.

The network migration apparatus provided in this embodiment of this application can implement the processes implemented by the first IAB node in the foregoing method embodiment. To avoid repetition, details are not described herein again.

This embodiment of this application provides the network migration apparatus. The network migration apparatus implements the migration procedure of the network migration apparatus only after determining that a corresponding migration command has been transmitted to a downstream network node. Therefore, it can be avoided that the migration command cannot be transmitted to the downstream network node if the network migration apparatus performs network migration when the migration command has not been forwarded to the downstream network node. This ensures that the downstream network node can migrate to a target network in a timely manner.

The network migration apparatus in this embodiment of this application may be an apparatus, or may be a component, an integrated circuit, or a chip of the first IAB node.

Figure 12:
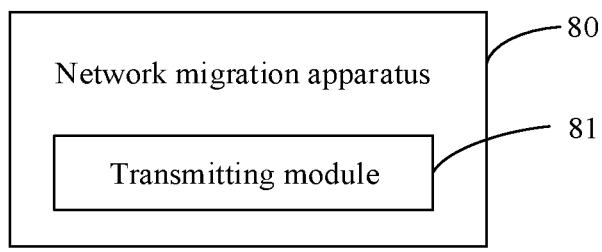
FIG. 12 is a fourth schematic structural diagram of a network migration apparatus according to an embodiment of this application.

FIG. 12 is a possible schematic structural diagram of a network migration apparatus according to an embodiment of this application. As shown in FIG. 12, the network migration apparatus 80 provided in this embodiment of this application may include a transmitting module 81.

The transmitting module 81 is configured to transmit a first migration command and a target migration command to a first IAB node in a migrating IAB network, where the first migration command is a migration command corresponding to the first IAB node, and the target migration command includes migration commands corresponding to all downstream network nodes of the first IAB node in the IAB network. The first migration command is used by the first IAB node to implement a migration procedure of the first IAB node in a case that the target migration command has been transmitted to a target network node, where the target network node is a downstream child IAB node of the first IAB node or UE served by the first IAB node in the IAB network.

In a possible implementation, in a case that the first IAB node is an uppermost-stream network node in the IAB network, the first migration command is transmitted by a source CU to the first IAB node. In a case that the first IAB node is any downstream IAB node in the IAB network, the first migration command is forwarded by a source CU to the first IAB node via an upstream network node of the first IAB node.

In a possible implementation, the first IAB node is an uppermost-stream network node in the IAB network. The transmitting module 81 is specifically configured to preferentially transmit the target migration command to the first IAB node, and then transmit the first migration command to the first IAB node.

In a possible implementation, the transmitting module 81 is specifically configured to transmit at least one signaling container to the first IAB node, where each signaling container includes a migration command corresponding to one network node in the IAB network, and the at least one signaling container is directly transmitted by the source CU to the first IAB node or forwarded by the source CU to the first IAB node via an upstream network node of the first IAB node. Each signaling container is a radio resource control RRC signaling container or an F1-AP signaling container.

The network migration apparatus provided in this embodiment of this application can implement the processes implemented by the source CU in the foregoing method embodiment. To avoid repetition, details are not described herein again.

This embodiment of this application provides the network migration apparatus. The network migration apparatus may transmit the target migration command and the first migration command to the first IAB node, to enable the first IAB node to implement the migration procedure of the first IAB node in a case that the target migration command has been transmitted to the target network node. Therefore, it can be avoided that the migration command cannot be transmitted to the downstream network node if the first IAB node performs network migration when the migration command has not been forwarded to the downstream network node. This ensures that the downstream network node can migrate to the target network in a timely manner.

The network migration apparatus in this embodiment of this application may be an apparatus, or may be a component, an integrated circuit, or a chip of the source CU.

Figure 13:
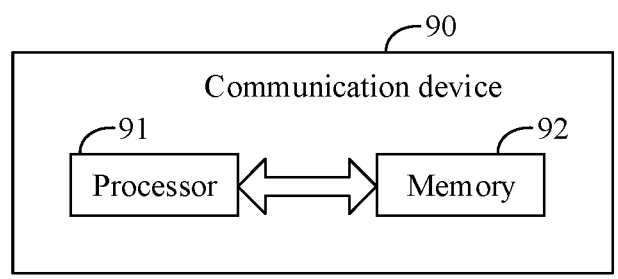
FIG. 13 is a schematic structural diagram of a communication device according to an embodiment of this application.

Optionally, as shown in FIG. 13, an embodiment of this application further provides a communication device 90, including a processor 91, a memory 92, and a program or instructions stored in the memory 92 and capable of running on the processor 91. For example, if the communication device 90 is an IAB node, when the program or the instructions are executed by the processor 91, the processes implemented by the first IAB node in the foregoing method embodiments are implemented, with the same technical effects achieved. To avoid repetition, details are not described herein again. If the communication device 90 is a CU, when the program or the instructions are executed by the processor 91, the processes implemented by the source CU in the foregoing method embodiments are implemented, with the same technical effects achieved. To avoid repetition, details are not described herein again.

Figure 14:
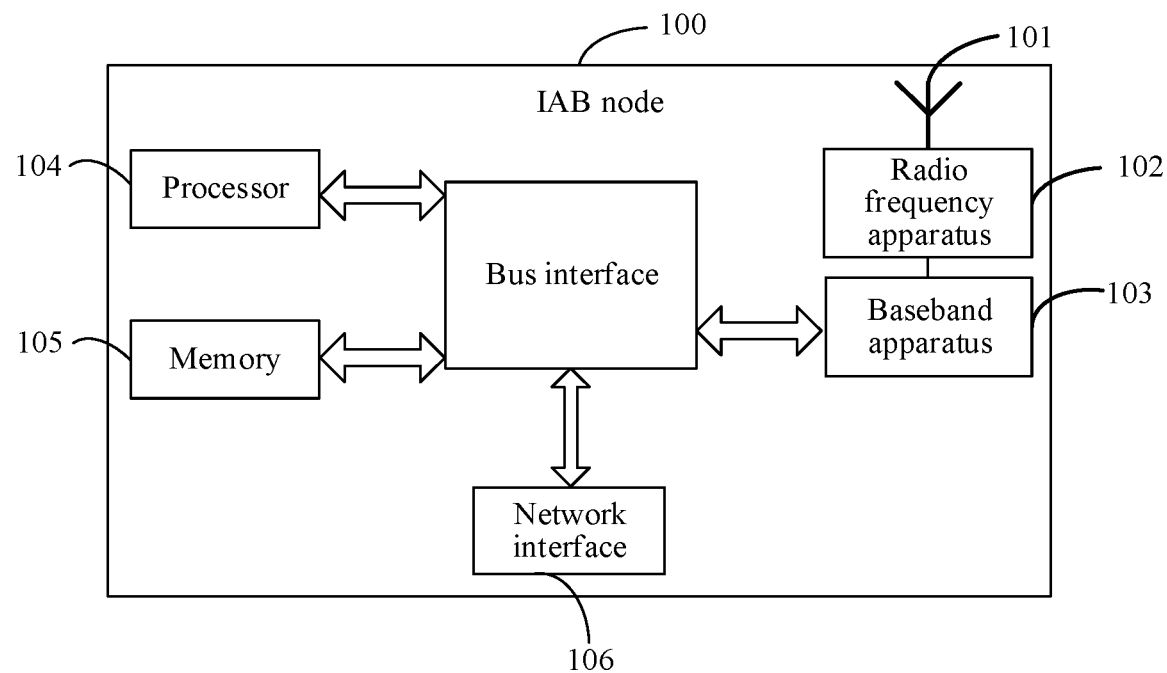
FIG. 14 is a schematic diagram of hardware of an IAB node according to an embodiment of this application.

An embodiment of this application further provides an IAB node. FIG. 14 is a schematic structural diagram of hardware of an IAB node according to an embodiment of this application.

As shown in FIG. 14, the IAB node 100 includes an antenna 101, a radio frequency apparatus 102, and a baseband apparatus 103. The antenna 101 is connected to the radio frequency apparatus 102. In an uplink direction, the radio frequency apparatus 102 receives information by using the antenna 101, and transmits the received information to the baseband apparatus 103 for processing. In a downlink direction, the baseband apparatus 103 processes to-be-transmitted information, and transmits the information to the radio frequency apparatus 102; and the radio frequency apparatus 102 processes the received information, and then transmits the information by using the antenna 101.

The method performed by the IAB node in the foregoing embodiment may be implemented by the baseband apparatus 103, and the baseband apparatus 103 includes a processor 104 and a memory 105.

The baseband apparatus 103 may include, for example, at least one baseband processing unit, where a plurality of chips are disposed on the baseband processing unit. As shown in FIG. 14, one of the chips is, for example, the processor 104, and connected to the memory 105 to invoke a program in the memory 105 to perform the operations of the IAB node shown in the foregoing method embodiment.

The baseband apparatus 103 may further include a network interface 106, configured to exchange information with the radio frequency apparatus 102, where the interface is, for example, a common public radio interface (CPRI).

Specifically, the IAB node in this embodiment of this application further includes an instruction or a program stored in the memory 105 and capable of running on the processor 104. The processor 104 invokes the instruction or the program in the memory 105 to perform the method performed by the foregoing modules, with the same technical effects achieved. To avoid repetition, details are not described herein again.

An embodiment of this application further provides a readable storage medium, where the readable storage medium stores a program or instructions, and when the program or the instructions are executed by a processor, the processes of the foregoing method embodiments are implemented, with the same technical effects achieved. To avoid repetition, details are not described herein again.

The processor is the processor of the terminal in the foregoing embodiments. The readable storage medium includes a computer-readable storage medium, such as a ROM, a RAM, a magnetic disc, or an optical disc.

Figure 15:
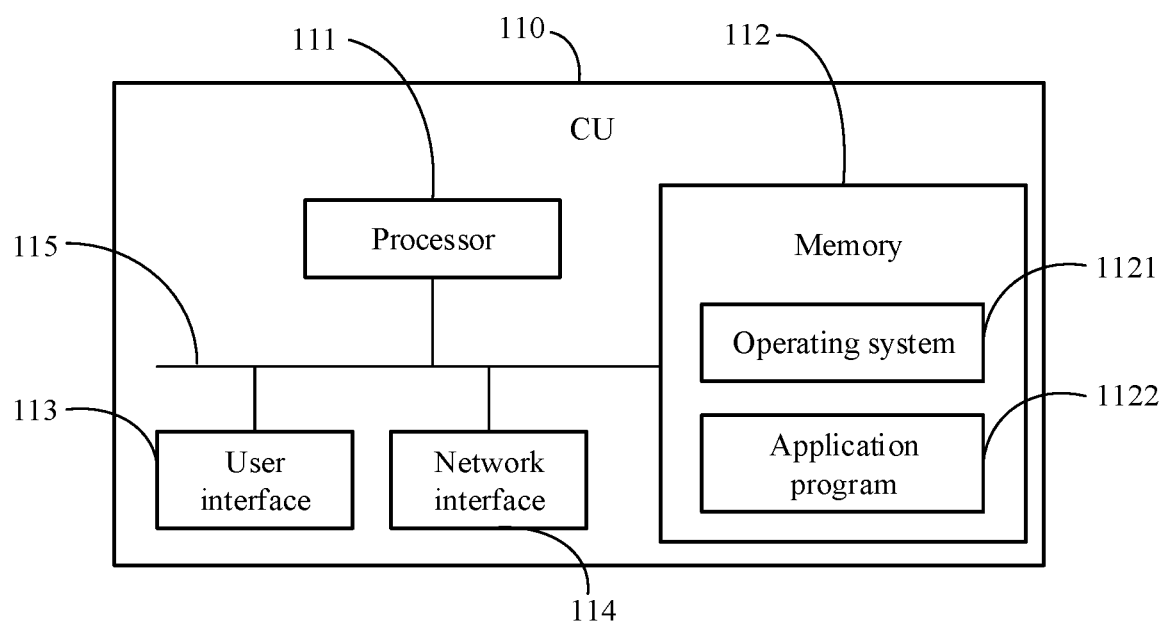
FIG. 15 is a schematic diagram of hardware of a CU according to an embodiment of this application.

An embodiment of this application further provides a CU. FIG. 15 is a schematic structural diagram of hardware of a CU according to an embodiment of this application.

The CU 110 includes but is not limited to at least one processor 111, a memory 112, a user interface 113, and at least one network interface 114. Components of the CU 110 are coupled together by using a bus system 115.

It should be noted that a person skilled in the art can understand that the structure of the CU 110 shown in FIG. 15 does not constitute a limitation on the CU. The CU may include more or fewer components than shown in FIG. 15, or some components may be combined, or the components may be disposed in different manners.

In this embodiment of this application, the at least one network interface 114 is configured to transmit a first migration command and a target migration command to a first IAB node in a migrating IAB network, where the first migration command is a migration command corresponding to the first IAB node, and the target migration command includes migration commands corresponding to all downstream network nodes of the first IAB node in the IAB network. The first migration command is used by the first IAB node to implement a migration procedure of the first IAB node in a case that the target migration command has been transmitted to a target network node, where the target network node is a downstream child IAB node of the first IAB node or UE served by the first IAB node in the IAB network.

In this embodiment of this application, the source CU may transmit the target migration command and the first migration command to the first IAB node, to enable the first IAB node to implement the migration procedure of the first IAB node in a case that the target migration command has been transmitted to the target network node. Therefore, it can be avoided that the migration command cannot be transmitted to the downstream network node if the first IAB node performs network migration when the migration command has not been forwarded to the downstream network node. This ensures that the downstream network node can migrate to the target network in a timely manner.

It can be understood that the bus system 115 is used to implement a connection and communication between these components. In addition to a data bus, the bus system 115 further includes a power bus, a control bus, and a status signal bus. However, for clarity of description, various buses are marked as the bus system 115 in FIG. 15.

The user interface 113 may include a display, a keyboard, a pointing device (for example, a mouse or a trackball, a touch panel or a touchscreen), or the like.

It can be understood that the memory 112 in this embodiment of this application may be a volatile memory or a non-volatile memory, or may include both a volatile memory and a non-volatile memory. The non-volatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. By way of example but not restrictive description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDRSDRAM), an enhanced synchronous dynamic random access memory (enhanced SDRAM, ESDRAM), a synchronous link dynamic random access memory (synch link DRAM, SLDRAM), and a direct rambus random access memory (direct rambus RAM, DRRAM). The memory 112 described in this embodiment of this application is intended to include but is not limited to these and any other suitable types of memories.

In some embodiments, the memory 112 stores the following elements: an executable module or a data structure, or a subset thereof, or an extended set thereof: an operating system 1121 and an application program 1122.

The operating system 1121 includes various system programs, such as a framework layer, a core library layer, and a driver layer, for implementing various basic services and processing hardware-based tasks. The application program 1122 includes various application programs, such as a media player and a browser, and is used to implement various application services. A program for implementing the method in this embodiment of this application may be included in the application program 1122.

In this embodiment of this application, the CU 110 may further include a program or instructions stored in the memory 112 and capable of running on the processor 111. When the program or the instructions are executed by the processor 111, the steps of the methods provided in the embodiments of this application are implemented.

The method disclosed in the foregoing embodiments of this application may be applied to the processor 111 or implemented by the processor 111. The processor 111 may be an integrated circuit chip with a signal processing capability. During implementation, the steps of the foregoing methods may be implemented by hardware integrated logic circuits in the processor 111 or instructions in the form of software. The foregoing processor 111 may be a general-purpose processor, a digital signal processor (DSP), an application specific integrated circuit (ASIC), a field programmable gate array (FPGA) or another programmable logic device, a discrete gate or transistor logic device, or a discrete hardware component. The processor 111 may implement or execute the methods, steps, and logical block diagrams disclosed in the embodiments of this application. The general-purpose processor may be a microprocessor or any regular processor. The steps of the methods disclosed with reference to the embodiments of this application may be directly implemented by a hardware decoding processor, or may be implemented by a combination of hardware and software modules in a decoding processor. The software module may be located in a computer-readable storage medium that is mature in the art, such as a random access memory, a flash memory, a read-only memory, a programmable read-only memory, or an electrically erasable programmable memory, or a register. The computer-readable storage medium is located in the memory 112, and the processor 111 fetches information in the memory 112, and completes the steps of the foregoing method in combination with its hardware. Specifically, the computer-readable storage medium stores a program or instructions, and when the program or the instructions are executed by the processor 111, the steps of the method embodiments provided in the embodiments of this application are implemented.

It can be understood that the embodiments described in the embodiments of this application may be implemented by hardware, software, firmware, middleware, microcode, or a combination thereof. In implementation by hardware, a processing unit may be implemented in one or more ASICs, a DSP, a digital signal processing device (DSP device, DSPD), a programmable logic device (PLD), an FPGA, a general-purpose processor, a controller, a microcontroller, a microprocessor, other electronic units used to implement the functions described in this application, or a combination thereof.

For software implementation, the technologies described in the embodiments of this application may be implemented by modules (for example, processes or functions) that perform the functions described in the embodiments of this application. Software code may be stored in the memory and executed by the processor. The memory may be implemented in or outside the processor.

An embodiment of this application further provides a readable storage medium, where the readable storage medium stores a program or instructions. When the program or the instructions are executed by a processor 111 shown in FIG. 15, the processes of the foregoing method embodiments are implemented, with the same technical effects achieved. To avoid repetition, details are not described herein again. The computer-readable storage medium is, for example, a ROM, a RAM, a magnetic disc, or an optical disk.

An embodiment of this application further provides a chip. The chip includes a processor and a communication interface. The communication interface is coupled to the processor. The processor is configured to run a program or instructions of a communication device to implement the processes of the foregoing method embodiments, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element. In addition, it should be noted that the scopes of the method and apparatus in the embodiments of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the embodiments, persons skilled in the art may clearly understand that the method in the foregoing embodiments may be implemented by software with a necessary general hardware platform. Certainly, the method in the foregoing embodiments may also be implemented by hardware. However, in many cases, the former is an example embodiment. Based on such an understanding, the technical solutions of this application essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

What is claimed is:

1. A network migration method, wherein the method comprises:
    implementing, by a first integrated access backhaul (IAB) node, a migration procedure of the first IAB node according to a received first migration command in a case that a target migration command has been transmitted to a target network node by the first IAB node, wherein the first IAB node is an IAB node in a migrating IAB network; wherein
    the target network node is a downstream child IAB node of the first IAB node or user equipment UE served by the first IAB node in the IAB network, the target migration command comprises migration commands corresponding to all downstream network nodes of the first IAB node in the IAB network, and the first migration command is a migration command corresponding to the first IAB node,
    the target migration command is configured to enable a downstream network node of the first IAB node to migrate from a source centralized unit (CU) network to a target CU network; the first migration command is configured for the first IAB node to migrate from the source CU network to the target CU network.

2. The method according to claim 1, wherein in a case that the first IAB node is an uppermost-stream network node in the IAB network, the first migration command is directly transmitted by a source centralized unit (CU) to the first IAB node; or
    in a case that the first IAB node is any downstream IAB node in the IAB network, the first migration command is forwarded by a source CU to the first IAB node via an upstream network node of the first IAB node.

3. The method according to claim 2, wherein the first IAB node is an uppermost-stream network node in the IAB network; and
    before the implementing, by a first IAB node, a migration procedure of the first IAB node according to a received first migration command in a case that a target migration command has been transmitted to a target network node, the method further comprises:
    receiving, by the first IAB node, the target migration command from the source CU, and transmitting the target migration command to the target network node; and
    receiving, by the first IAB node, the first migration command from the source CU.

4. The method according to claim 1, wherein before the implementing, by a first IAB node, a migration procedure of the first IAB node according to a received first migration command in a case that a target migration command has been transmitted to a target network node, the method further comprises:
    receiving, by the first IAB node, the target migration command and the first migration command, and transmitting the target migration command to the target network node within a first preset time period, wherein the first preset time period is a preset time period starting from a moment when the target migration command and the first migration command are received; and
    the implementing, by a first IAB node, a migration procedure of the first IAB node according to a received first migration command comprises:
    implementing, by the first IAB node, the migration procedure of the first IAB node according to the first migration command after the first preset time period expires.

5. The method according to claim 1, wherein before the implementing, by a first IAB node, a migration procedure of the first IAB node according to a received first migration command in a case that a target migration command has been transmitted to a target network node, the method further comprises:
    receiving, by the first IAB node, at least one signaling container, wherein each signaling container comprises a migration command corresponding to one network node in the IAB network, and the at least one signaling container is directly transmitted by the source CU to the first IAB node or forwarded by the source CU to the first IAB node via the upstream network node of the first IAB node; and
    determining, by the first IAB node based on the at least one signaling container, the first migration command and the target migration command, and determining, based on a count of the at least one signaling container, whether the target migration command has been transmitted to the target network node; wherein
    each signaling container is a radio resource control (RRC) signaling container or an F1 application protocol (F1-AP) signaling container.

6. The method according to claim 1, wherein after the implementing a migration procedure of the first IAB node, the method further comprises:
  transmitting, by the first IAB node, first migration complete information to a target CU when migration of the first IAB node has been completed, wherein the first migration complete information is used to indicate that migration of the first IAB node has been completed.

7. The method according to claim 1, wherein after the implementing a migration procedure of the first IAB node, the method further comprises:
  in a case that RRC signaling from the target network node has been received, transmitting, by the first IAB node, the RRC signaling to a target CU when migration of the first IAB node has been completed; or
  in a case that RRC signaling from the target network node has been received, caching, by the first IAB node, the RRC signaling when migration of the first IAB node has not been completed, and transmitting the RRC signaling to a target CU after migration of the first IAB node has been completed.

8. The method according to claim 7, wherein the RRC signaling comprises second migration complete information of the target network node, and the second migration complete information is used to indicate that migration of the target network node has been completed.

9. The method according to claim 8, wherein the second migration complete information is information carried in a specific radio link control (RLC) channel.

10. A network migration method, wherein the method comprises:
  transmitting, by a source centralized unit (CU), a first migration command and a target migration command to a first integrated access backhaul (IAB) node in a migrating IAB network, wherein the first migration command is a migration command corresponding to the first IAB node, and the target migration command comprises migration commands corresponding to all downstream network nodes of the first IAB node in the IAB network; wherein
  the first migration command is used by the first IAB node to implement a migration procedure of the first IAB node in a case that the target migration command has been transmitted to a target network node by the first IAB node, wherein the target network node is a downstream child IAB node of the first IAB node or user equipment UE served by the first IAB node in the IAB network,
  the target migration command is configured to enable a downstream network node of the first IAB node to migrate from a source centralized unit (CU) network to a target CU network; the first migration command is configured for the first IAB node to migrate from the source CU network to the target CU network.

11. The method according to claim 10, wherein in a case that the first IAB node is an uppermost-stream network node in the IAB network, the first migration command is transmitted by the source CU to the first IAB node; or
  in a case that the first IAB node is any downstream IAB node in the IAB network, the first migration command is forwarded by the source CU to the first IAB node via an upstream network node of the first IAB node.

12. The method according to claim 11, wherein the first IAB node is an uppermost-stream network node in the IAB network; and
  the transmitting, by a source CU, a first migration command and a target migration command to a first IAB node in a migrating IAB network comprises:
  preferentially transmitting, by the source CU, the target migration command to the first IAB node, and then transmitting the first migration command to the first IAB node.

13. The method according to claim 10, wherein the transmitting, by a source CU, a first migration command and a target migration command to a first IAB node in a migrating IAB network comprises:
  transmitting, by the source CU, at least one signaling container to the first IAB node, wherein each signaling container comprises a migration command corresponding to one network node in the IAB network, and the at least one signaling container is directly transmitted by the source CU to the first IAB node or forwarded by the source CU to the first IAB node via an upstream network node of the first IAB node; wherein
  each signaling container is a radio resource control (RRC) signaling container or an F1 application protocol (F1-AP) signaling container.

14. An integrated access backhaul (IAB) node, comprising a processor, a memory, and a program or instructions stored on the memory and capable of running on the processor, wherein when the program or the instructions are executed by the processor, the steps of a network migration method are implemented, wherein the method comprises:
  implementing, by a first IAB node, a migration procedure of the first IAB node according to a received first migration command in a case that a target migration command has been transmitted to a target network node by the first IAB node, wherein the first IAB node is an IAB node in a migrating IAB network; wherein
  the target network node is a downstream child IAB node of the first IAB node or user equipment UE served by the first IAB node in the IAB network, the target migration command comprises migration commands corresponding to all downstream network nodes of the first IAB node in the IAB network, and the first migration command is a migration command corresponding to the first IAB node,
  the target migration command is configured to enable a downstream network node of the first IAB node to migrate from a source centralized unit (CU) network to a target CU network; the first migration command is configured for the first IAB node to migrate from the source CU network to the target CU network.

15. The IAB node according to claim 14, wherein in a case that the first IAB node is an uppermost-stream network node in the IAB network, the first migration command is directly transmitted by a source centralized unit (CU) to the first IAB node; or
  in a case that the first IAB node is any downstream IAB node in the IAB network, the first migration command is forwarded by a source CU to the first IAB node via an upstream network node of the first IAB node.

16. The IAB node according to claim 15, wherein the first IAB node is an uppermost-stream network node in the IAB network; and
  before the implementing, by a first IAB node, a migration procedure of the first IAB node according to a received first migration command in a case that a target migration command has been transmitted to a target network node, the method further comprises:

receiving, by the first IAB node, the target migration command from the source CU, and transmitting the target migration command to the target network node; and receiving, by the first IAB node, the first migration command from the source CU.

17. The IAB node according to claim 14, wherein before the implementing, by a first IAB node, a migration procedure of the first IAB node according to a received first migration command in a case that a target migration command has been transmitted to a target network node, wherein when the program or the instructions are executed by the processor, the IAB node further implements:

receiving, by the first IAB node, the target migration command and the first migration command, and transmitting the target migration command to the target network node within a first preset time period, wherein the first preset time period is a preset time period starting from a moment when the target migration command and the first migration command are received; and the implementing, by a first IAB node, a migration procedure of the first IAB node according to a received first migration command comprises:

implementing, by the first IAB node, the migration procedure of the first IAB node according to the first migration command after the first preset time period expires.

18. The IAB node according to claim 14, wherein before the implementing, by a first IAB node, a migration procedure of the first IAB node according to a received first migration command in a case that a target migration command has been transmitted to a target network node, wherein when the program or the instructions are executed by the processor, the IAB node further implements:

receiving, by the first IAB node, at least one signaling container, wherein each signaling container comprises a migration command corresponding to one network node in the IAB network, and the at least one signaling container is directly transmitted by the source CU to the first IAB node or forwarded by the source CU to the first IAB node via the upstream network node of the first IAB node; and determining, by the first IAB node based on the at least one signaling container, the first migration command and the target migration command, and determining, based on a count of the at least one signaling container, whether the target migration command has been transmitted to the target network node; wherein each signaling container is a radio resource control (RRC) signaling container or an F1 application protocol (F1-AP) signaling container.

19. The IAB node according to claim 14, wherein after the implementing a migration procedure of the first IAB node, wherein when the program or the instructions are executed by the processor, the IAB node further implements:

transmitting, by the first IAB node, first migration complete information to a target CU when migration of the first IAB node has been completed, wherein the first migration complete information is used to indicate that migration of the first IAB node has been completed.

20. A centralized unit (CU), comprising a processor, a memory, and a program or instructions stored on the memory and capable of running on the processor, wherein when the program or the instructions are executed by the processor, the steps of the network migration method according to claim 10 are implemented.

* * * * *